(No Model.)
W. H. WHITELEY.
SOLAR OR OTHER BATH.
No. 478,385. Patented July 5, 1892.
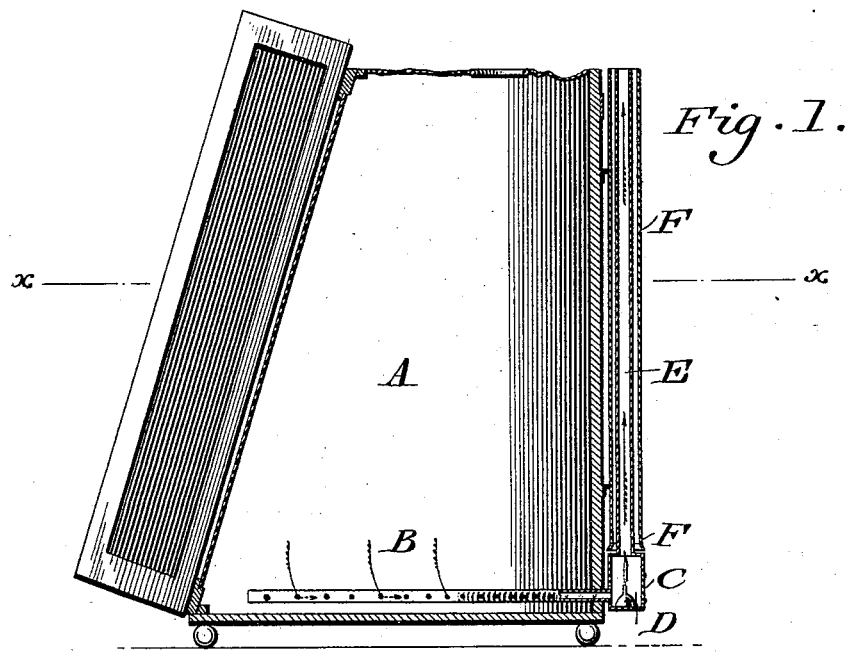
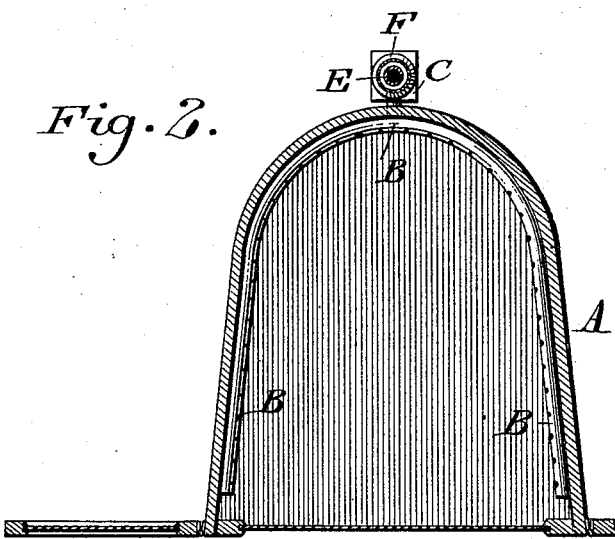
WITNESSES:
P. H. Eagle.
L. Douville.
INVENTOR
William H. Whiteley.
BY
ATTORNEY.

UNITED STATES PATENT OFFICE.

WILLIAM H. WHITELEY, OF DARBY, PENNSYLVANIA.

SOLAR OR OTHER BATH.

SPECIFICATION forming part of Letters Patent No. 478,385, dated July 5, 1892.

Application filed February 23, 1892. Serial No. 422,397. (No model.)

*To all whom it may concern:*

Be it known that I, WILLIAM H. WHITELEY, a citizen of the United States, residing at Darby, in the county of Delaware, State of Pennsylvania, have invented a new and useful Improvement in Solar or other Baths, which improvement is fully set forth in the following specification and accompanying drawings.

My invention consists of a solar or other bath provided with means, substantially as hereinafter described, for creating a downward draft therein, so that the lower extremities of the occupant thereof are properly warmed.

Figure 1 represents a vertical section of a solar bath embodying my invention. Fig. 2 represents a horizontal section thereof.

Similar letters of reference indicate corresponding parts in the two figures.

Referring to the drawings, A designates a solar bath, which, excepting the features of my invention applied thereto, is of well-known construction. Within the bath, at or near the bottom thereof, is a perforated pipe B, which communicates with a chamber C, the latter containing a lamp or other heating device D, and having connected with it a discharge-pipe E, said chamber and pipe being preferably outside of the bath. Surrounding the pipe E is a jacket F, of non-conducting material, the same being separated from the pipe, so that air may circulate around the pipe for cooling the same, while the jacket acts as a guard for preventing contact of the hands or body with the pipe, which, being heated, is liable to burn whatsoever touches it.

The operation is as follows: The chamber is heated, whereby, owing to the pipe B, a vacuum is created within the bath A. This draws down the heat in the bath, so that the feet and limbs of the occupant are subjected to the same. The heat entering the chamber D and the products of combustion therein are discharged through the pipe E.

In some baths, as heretofore constructed, owing to the ascending heat and descending heavy vapor, the bottom portions of the bath either remain or become cold, the effect of which is communicated to the lower extremities of the occupant of the bath; but this is obviated by the employment of means to direct heat to the bottom portions, as in my case, whereby the entire body of the occupant is subjected to heat—a most desirable feature in articles of the kind.

It will be noticed that by employing a lamp in the chamber C a steady or constant draft through the pipe B from the bath A is automatically produced.

Having thus described my invention, what I claim as new, and desire to secure by Letters Patent, is—

A bath having a perforated pipe in the lower portion thereof, a heating-chamber outside of said bath, in communication with said pipe, and a combustion discharge-pipe for said chamber, substantially as described.

WILLIAM H. WHITELEY.

Witnesses:
   JOHN A. WIEDERSHEIM,
   A. P. JENNINGS.